(12) United States Patent
Lemmers, Jr. et al.

(10) Patent No.: US 8,138,642 B2
(45) Date of Patent: Mar. 20, 2012

(54) OIL COOLED GENERATOR

(75) Inventors: Glenn C. Lemmers, Jr., Loves Park, IL (US); Scott R. Ganong, Stillman Valley, IL (US); Roy D. Rasmussen, Rockford, IL (US); Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 205 days.

(21) Appl. No.: 12/485,994

(22) Filed: Jun. 17, 2009

(65) Prior Publication Data

US 2010/0320850 A1    Dec. 23, 2010

(51) Int. Cl.
*H02K 9/19*    (2006.01)

(52) U.S. Cl. ............. 310/61; 310/216.004; 310/216.119

(58) Field of Classification Search .................... 310/52, 310/57, 58–59, 60 A, 60 R, 61–63, 194, 215, 310/216.004, 216.114–216.116, 216.119
See application file for complete search history.

(56) References Cited

U.S. PATENT DOCUMENTS

| | | | | |
|---|---|---|---|---|
| 2,708,724 A | * | 5/1955 | Martin et al. | 310/216.053 |
| 3,480,810 A | * | 11/1969 | Potter | 310/54 |
| 3,629,628 A | * | 12/1971 | Rank et al. | 310/54 |
| 4,139,789 A | | 2/1979 | Hunt | |
| 4,156,172 A | | 5/1979 | Hucker et al. | |
| 4,311,932 A | | 1/1982 | Olson | |
| 4,329,603 A | | 5/1982 | Ballard | |
| 4,342,932 A | * | 8/1982 | Glebov et al. | 310/52 |
| 4,513,218 A | | 4/1985 | Hansen | |
| 5,347,188 A | | 9/1994 | Iseman et al. | |
| 6,091,168 A | * | 7/2000 | Halsey et al. | 310/216.107 |
| 6,211,587 B1 | * | 4/2001 | Enomoto et al. | 310/52 |
| 6,483,210 B1 | * | 11/2002 | Soderberg | 310/52 |
| 6,727,609 B2 | | 4/2004 | Johnsen | |
| 6,844,637 B1 | | 1/2005 | Smith et al. | |
| 7,247,958 B2 | | 7/2007 | Iwashige et al. | |
| 2002/0079752 A1 | * | 6/2002 | Salamah et al. | 310/60 A |
| 2003/0048015 A1 | * | 3/2003 | Tornquist et al. | 310/103 |
| 2007/0228846 A1 | | 10/2007 | Rao | |
| 2008/0116760 A1 | * | 5/2008 | Hosoya et al. | 310/214 |

FOREIGN PATENT DOCUMENTS

JP    2003250239 A    *    9/2003

* cited by examiner

*Primary Examiner* — Tran Nguyen
(74) *Attorney, Agent, or Firm* — Carlson, Gaskey & Olds PC

(57) ABSTRACT

A rotor for a dynamoelectric machine may include a rotor shaft having a first shaft and a second shaft within the first shaft. The two shafts include discharge orifices for communicating a cooling fluid through the machine. A rotor core of the machine includes a lamination having an annular portion that circumscribes an open center, a plurality of pole portions extending outwardly from the annular portion, and coil winding regions adjacent to the pole portions. One or more channels extend between the open center and the coil winding regions to communicate a cooling fluid. Coil windings of the machine may be at least partially encased in insulators. Each insulator may include a fluid entry orifice located between the insulator ends to communicate a cooling fluid. An end plate of the machine may include fluid discharge outlets for communicating cooling fluid received from the coil windings.

18 Claims, 5 Drawing Sheets

OIL COOLED GENERATOR

BACKGROUND OF THE INVENTION

This disclosure relates to a cooling strategy for use in a generator.

Electrical generators typically include a shaft that is driven for rotation and which carries a plurality of field coils and/or permanent magnets. The generator may be used to also drive a hydraulic pump, such as for cooling the generator or other components of a system. The pump may communicate cooling oil back to the generator to maintain the generator at a desired operating temperature.

Different cooling schemes for distributing the cooling oil may be used for different types of generators. For instance, generators having greater than four poles have a significant amount of end winding area onto which the cooling oil can be sprayed to remove heat from the generator (i.e., impingement cooling scheme).

In generators having four poles or less, there is less coil end winding area and impingement cooling is therefore ineffective. In this case, a flood cooling scheme may be used in which the coils are contained within an outer housing and cooling oil is provided into one end of the housing to flow outwardly and then around the coils. However, flood cooling requires a robust housing structure to contain relatively high pressures created from the centrifugal force of the cooling oil flow within the housing. Moreover, for generators having short coil lengths and large diameters, the pressure would be greater and require large, expensive containment structures.

SUMMARY OF THE INVENTION

An example lamination for a dynamoelectric machine includes a rotor lamination body having an annular portion circumscribing an open center, a plurality of pole portions extending outwardly from the annular portion relative to the open center, and a plurality of coil winding regions adjacent to corresponding ones of the plurality of pole portions. The annular portion includes at least one channel running between the open center and at least one of the plurality of coil winding regions.

An example end plate for a dynamoelectric machine includes an end plate body having first and second sides. The first side includes a plurality of coil end winding cover portions circumferentially spaced around the first side, and at least one fluid discharge outlet that extends between the first and second sides and is located circumferentially between two of the coil end winding cover portions.

An example insulator for a coil winding of a dynamoelectric machine includes an elongated insulator body having an electrically insulating material circumscribing an interior coil winging region and spanning between open ends. The elongated insulator body includes a fluid entry orifice between the open ends.

An example rotor shaft for a dynamoelectric machine includes a first shaft having a first shaft wall circumscribing a hollow interior and having a first fluid discharge orifice extending through the first shaft wall. A second shaft is within the hollow interior and coupled with the first shaft such that the first shaft and the second shaft are co-rotatable. The second shaft includes a second shaft wall and a second fluid discharge orifice extending through the second shaft wall. The first discharge orifice and the second discharge orifice are axially spaced apart.

The lamination, rotor shaft, end plate, and insulator may be included in a dynamoelectric machine for communicating cooling fluid to coil windings of the machine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
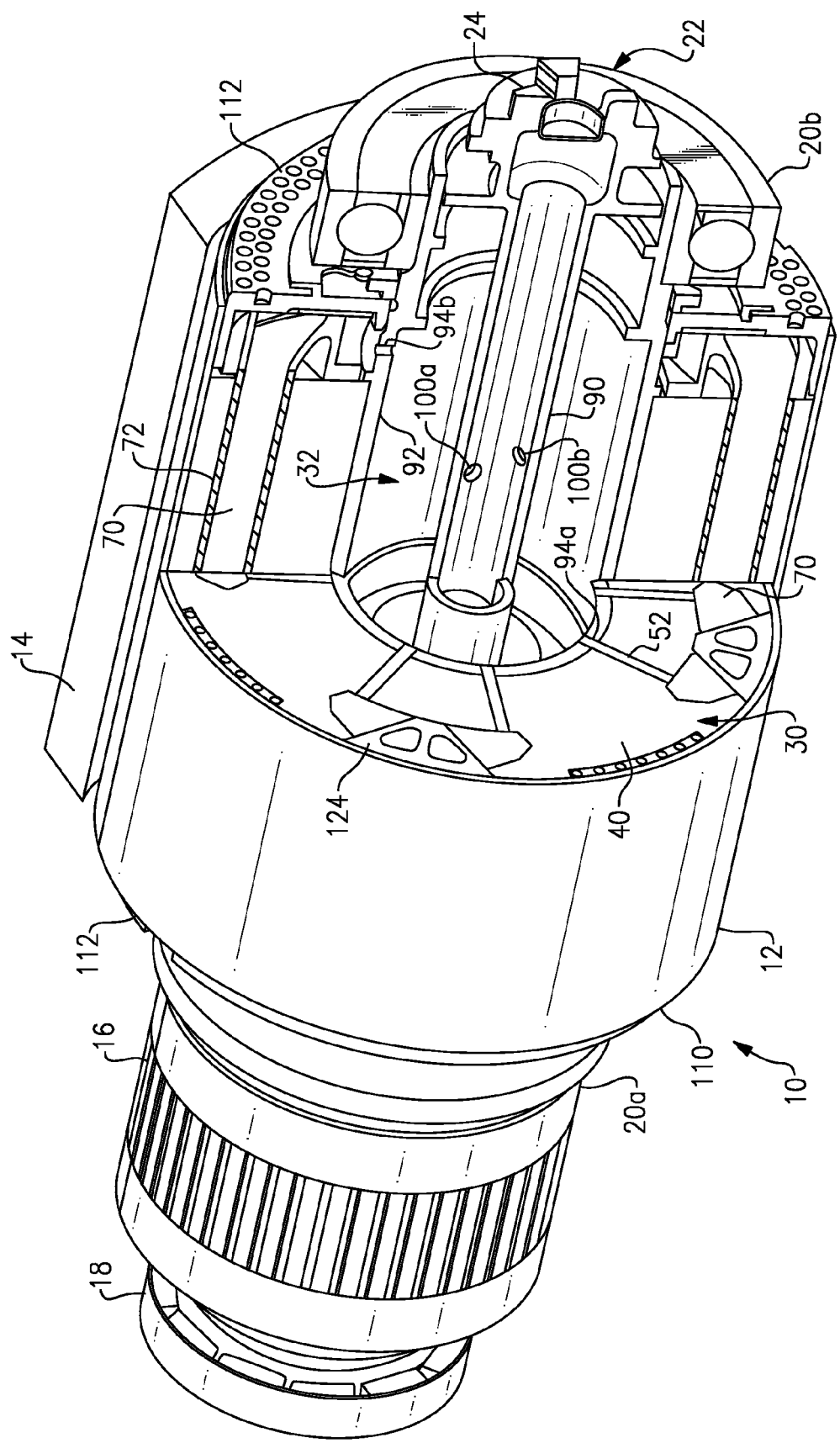
FIG. 1 illustrates an example generator.

FIG. 1 illustrates a cutaway view of an example generator 10, which may also be referred to as a dynamoelectric machine. For instance, the generator 10 may be a high speed, variable frequency, 4-pole generator for starting a gas turbine engine and generating electric current when being driven by the turbine engine. In the illustrated example, the generator 10 includes a rotor 12, or core, that rotates near a stator 14. An exciter rotor 16 and a permanent magnet rotor 18 provide control and safety functions in a known manner, and also are associated with their own stators (not shown). The rotor 12 is rotatable on bearings 20a and 20b.

A drive input 22 of the generator 10 includes a clutch member 24 for selectively driving the rotor 12. Aspects of the clutch member 24 and drive input 22 are found in co-pending patent application Ser. No. 12/436,159, filed on May 6, 2009, and entitled "Decoupler Shaft for High Speed Generator." The generator 10 may also include a rotor gear (not shown) that is driven by the rotor 12 and is disclosed in co-pending application Ser. No. 12/436,190, filed on May 6, 2009, and entitled "Rotor Gear for a Generator."

The exemplary generator 10 employs a dual mode cooling scheme for maintaining a desired operating temperature. The cooling scheme provides a flow of cooling fluid, such as oil, through coil windings 70 and an impingement flow of cooling fluid on the end areas of the coil windings 70. As will be described, the components of the generator 10 are designed to provide the cooling fluid to a central location of the coil windings 70 and a spray of cooling fluid as impingement flow on the ends of the coil windings 70. A generator that utilizes only end turn impingement cooling may have greater than four poles and a length-to-diameter ratio of approximately 0.64. A generator that utilizes only flood cooling may have less than four poles and a length-to-diameter ratio of approximately 1.13. However, the four pole generator 10 of the disclosed examples may have an intermediate length-to-diameter ratio, such as approximately 0.77±0.05. Using flood cooling alone would likely require a robust structure and increased expense, while using impingement cooling alone would not likely provide adequate cooling because of the relatively low end turn area. However, the dual cooling scheme of the generator 10 provides an efficient, compact cooling arrangement.

Figure 2:
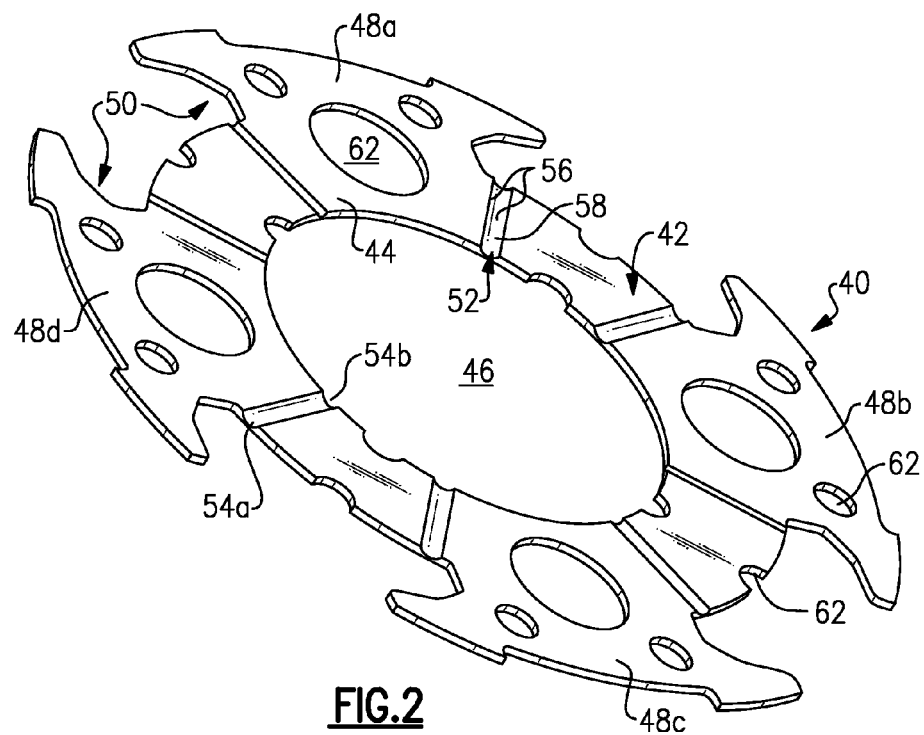
FIG. 2 illustrates an example lamination used in a rotor core of the generator.

The rotor 12 includes a plurality of stacked laminations 30 that are mounted for rotation on a rotor shaft assembly 32. Referring also to FIG. 2, the stacked laminations 30 include at least one lamination 40 that is adapted to communicate cooling fluid from the rotor shaft assembly 32. The lamination 40 may be in the center of the stack. Alternatively, the lamination 40 may be on one side of center or the other, or multiple laminations 40 may be used in combination with laminations that do not communicate cooling fluid from the rotor shaft assembly 32. In this example, the lamination 40 includes a body 42 having an annular portion 44 that circumscribes an open center 46. A plurality of pole portions 48a-d extends outwardly from the annular portion 44 relative to the open center 46. A plurality of coil winding regions 50 are located adjacent to the plurality of pole portions 48a-d. The annular portion 44 includes a plurality of channels 52 running between the open center 46 and corresponding ones of the coil winding regions 50. In this case, the annular portion includes eight channels 52; however, additional channels 52, or fewer channels 52, may be used depending on the needs of a particular application. The generator includes a ratio of a number of the channels 52 to the number of poles of the generator 10. In this example the ratio is two, however, the number of channels and poles may be varied such that the ratio is between one and two.

Each of the channels includes open ends 54a and 54b, side walls 56, and a bottom wall 58. The channels 52 may each have a profile, or cross-section, having curved side walls 56 and/or bottom walls 58. The top surface of each of the channels 52 is open and, when the lamination 40 is stacked against a neighboring lamination, forms a closed channel with the ends 54a and 54b being open.

The lamination 40 also includes weight-reducing openings 62. The weight-reducing openings 62 may align with weight-reducing openings of neighboring laminations. The weight-reducing openings 62 may be designed such that the lamination 40 and the stack of laminations 30 maintain a desired level of strength.

The coil windings 70 are wound around the poles of the stack of laminations 30, including the pole portions 48a-d of lamination 40. In this case, each of the coil windings 70 is at least partially encased in an insulator 72. Each coil winding 70 may have two insulators 72, one on each side of the winding.

Figure 3:
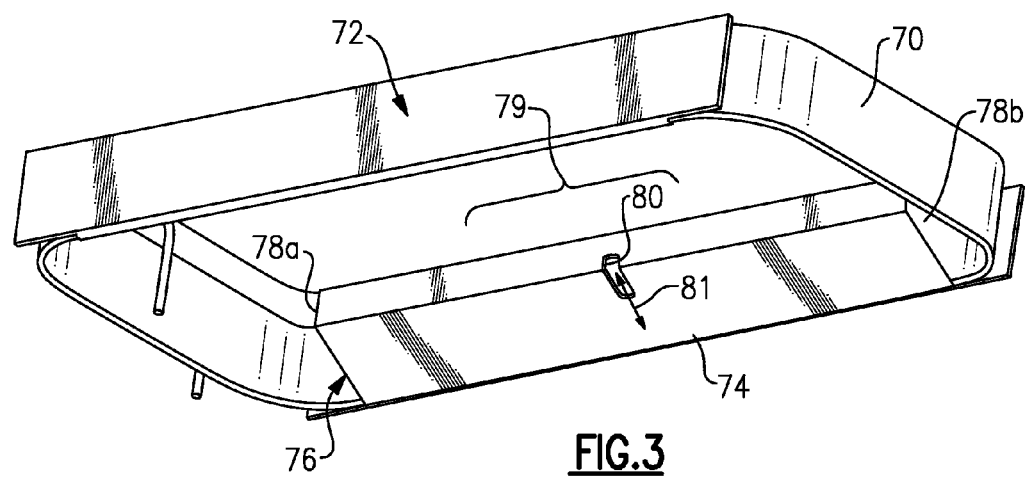
FIG. 3 illustrates an example insulator used on a coil winding of the generator.

Referring also to FIG. 3, the insulator 72 is generally an electrical insulator that isolates the coil winding 70 from metallic structures in the generator 10. For example, the insulator may be formed of a polymer material, such as polyimide. The insulator 72 includes an elongated insulator body 74 that generally circumscribes an interior coil winding region 76 through which at least a portion of the coil winding 70 extends. The elongated insulator body 74 spans between open ends 78a and 78b and includes a fluid entry orifice 80 that is located between the open ends 78a and 78b.

In this example, the fluid entry orifice 80 is located within a middle one-third 79 of the length of the elongated insulator body 74 to uniformly distribute the cooling fluid. The orifice 80 is elongated in a direction 81 that is non-parallel to the lengthwise direction of the insulator body 74 that spans between the open ends 78a and 78b.

The stacked laminations 30 and the coil windings 70 are mounted for rotation on the rotor shaft assembly 32, which includes an inner shaft 90 and an outer shaft 92 that are coupled together for co-rotation. The inner shaft 90 is coupled to the clutch member 24 for selectively engaging the rotor 12. The outer shaft 92 includes a hollow interior and at least one orifice 94a for communicating cooling oil to the coil windings 70 through the channels 52 of the lamination 40. In the illustrated example, the outer shaft 92 includes eight orifices 94a that are radially aligned with the eight channels 52 of the lamination 40. The outer shaft 92 also includes additional orifices 94b that are axially spaced apart from the orifices 94a. The orifices 94b are axially aligned with the ends of the coil windings 70 for providing impingement flow of the cooling fluid, as will be discussed in more detail below. The rotor shaft assembly 32 may also include other orifices to supply cooling fluid to the bearings 20a or 20b, for example.

The inner shaft 90 is in communication with a fluid transfer tube 98 for communicating cooling fluid from a hydraulic pump or the like, to cool the rotor 12. Aspects of the shaft assembly 32 and fluid transfer tube 98 can be found in co-pending application Ser. No. 12/436,161, filed on May 6, 2009, and entitled "Generator Rotor with Improved Hollow Shaft."

The inner shaft 90 includes at least one orifice 100a for discharging cooling fluid received from the fluid transfer tube 98 into the hollow interior of the outer shaft 92. The inner shaft 90 may also include another discharge orifice 100b located axially downstream from the first discharge orifice 100a. The orifices are staggered to reduce shaft stresses. In this example, the inner shaft 90 includes six orifices 100a and 100b (two are shown), however, the inner shaft 90 may include additional or fewer orifices. The rotor shaft assembly 32 also includes a ratio of a number of the orifices 94a that provide flow to the channels 52 to a number of the orifices 100a and 100b. In one example, the ratio is between one and four. In a further example, the ratio is two.

Figure 4B:
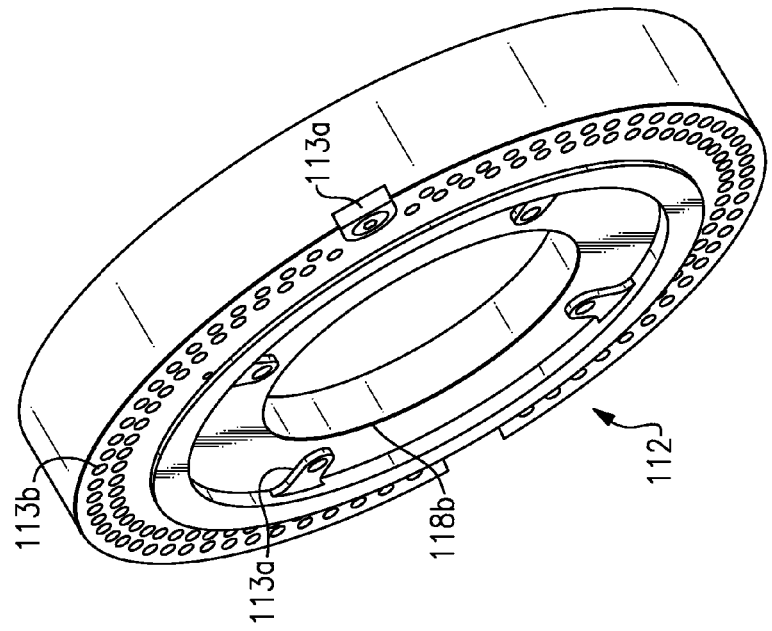
FIG. 4B illustrates a perspective view of the outer surface of an end plate of the generator.
Figure 4C:
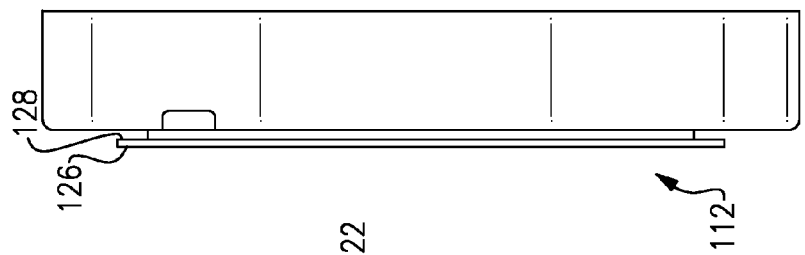
FIG. 4C illustrates a side view of an end plate used in the generator.
Figure 4A:
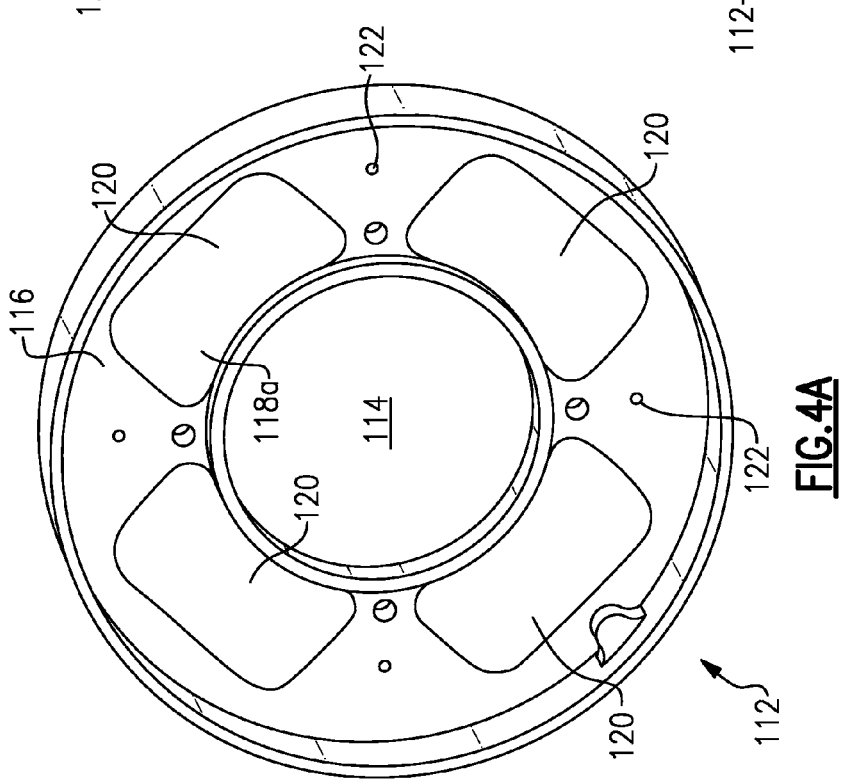
FIG. 4A illustrates a view of an inner surface of an end plate of the generator.

The rotor core, which may include the stack of laminations 30 and the coil windings 70, is contained within a sleeve 110. The sleeve 110 is generally cylindrical and is sealed at each end with an end plate 112 in an interference fit, for example. Referring to FIGS. 4A-C, each of the end plates 112 provide a plurality of circumferential fasteners 113b locations for mounting tabs (not shown) for prevention of sleeve axial movement. As an example, the ends plates 112 may include features found in co-pending application Ser. No. 12/436, 177, filed on May 6, 2009, entitled "END PLATES FOR HIGH SPEED GENERATOR APPLICATIONS."

The end plate 112 is generally in the shape of a cup with an open center 114 through which the rotor shaft assembly 32 extends. In this case, the end plate 112 includes an end wall 116 having a first side 118a and a second, opposite side 118b. The first side 118a faces inwards toward the ends of the coil winding 70, while the outer side 118b faces toward the bearing 20a or 20b.

The first side 118a includes a plurality of coil end winding cover portions 120 that are circumferentially spaced around the first side 118a. Each of the coil end winding cover portions 120 is generally planar and is located immediately axially adjacent to an end of one of the coil windings 70. In this example, the end plate 112 includes fluid discharge outlets 122 that are also circumferentially spaced around the end plate 112. Each fluid discharge outlet 122 is circumferentially between two of the coil end winding cover portions 120. The fluid discharge outlets 122 each extend between the first and second sides 118a and 118b. When assembled in the rotor 12, the fluid discharge outlets 122 may be axially aligned with wedges 124 (FIG. 1) that are located between the coil windings 70. The radial location of the fluid discharge outlets 122 facilitates maintaining the coil windings 70, except the end turns, submerged in cooling fluid. As an example, the wedges 124 may include features found in co-pending patent application Ser. No. 12/411,468, filed on May 26, 2009, and entitled "GENERATOR ROTOR WITH IMPROVED WEDGES."

The generator 10 is designed with a ratio of the number of channels 52 in the lamination 40 to the number of fluid discharge orifices 122 in one of the end plates 120. In one example, the ratio is between one-half and four. In a further example, the ratio is two.

Each of the fluid discharge outlets 122 extends between the first side 118a and the second side 118b. The body of the end plate 112 also includes an annular flange 126 that is axially spaced from, and axially aligned with, the fluid discharge outlets 122. Thus, any fluid discharged from the fluid discharge orifices 122 impinges on an inner surface 128 of the flange 126 and is directed radially outwards.

Figure 5:
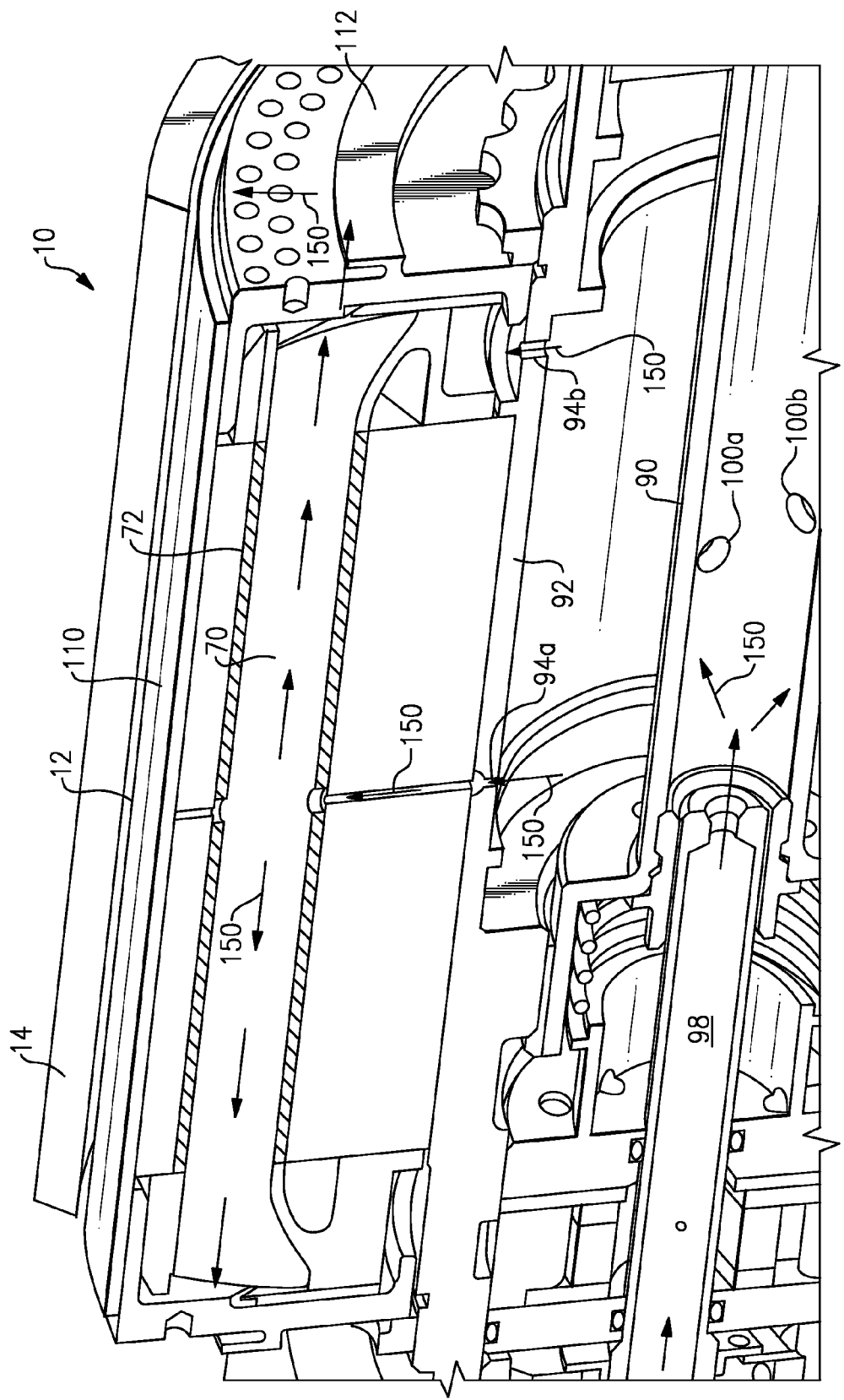
FIG. 5 illustrates a flow of cooling oil through the rotor of the generator.
Figure 6:
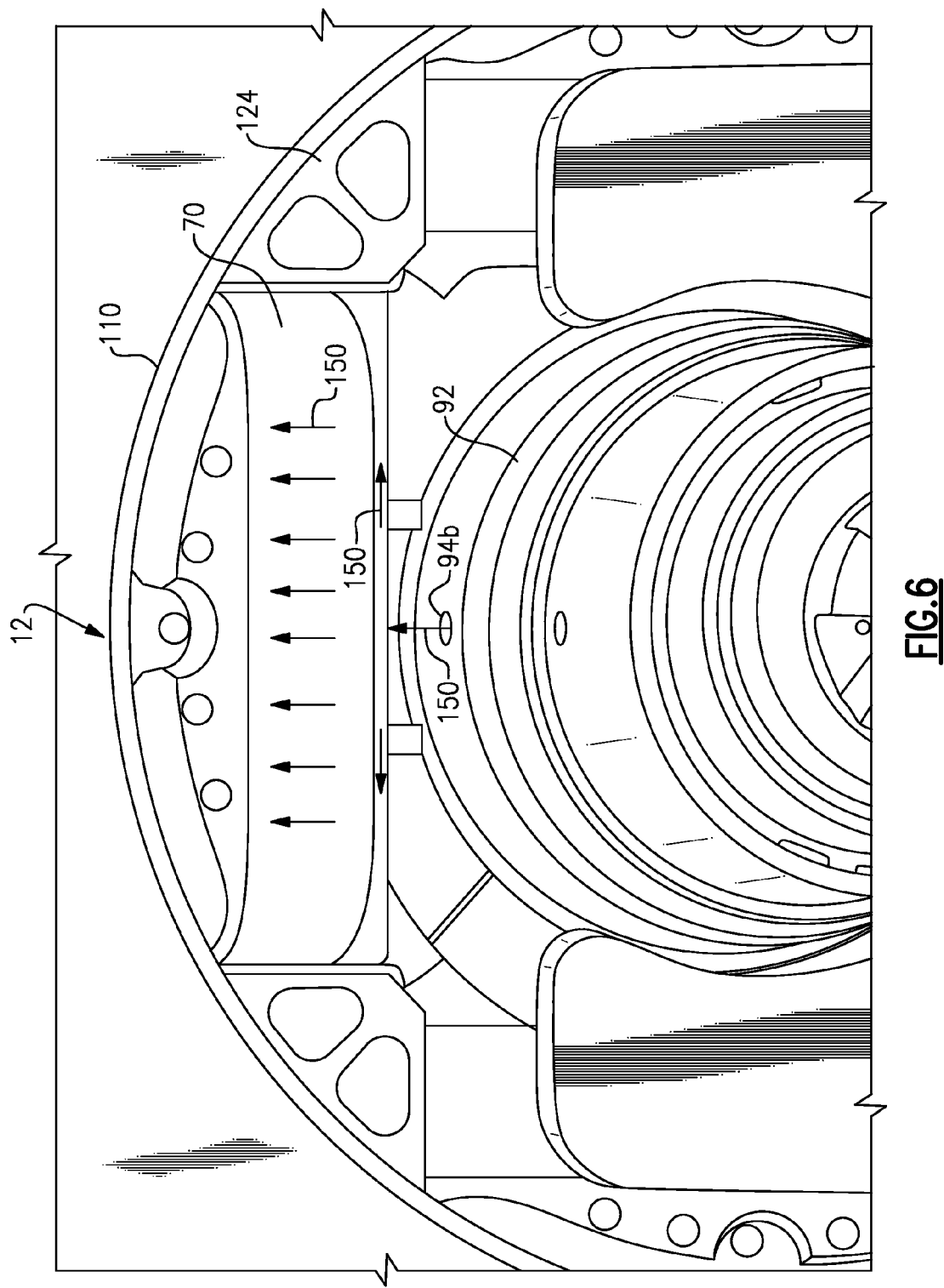
FIG. 6 illustrates impingement cooling oil flow onto an end portion of a coil winding in the generator.

FIGS. 5 and 6 illustrate portions of the generator 10, with arrows 150 representing a flow of cooling fluid. The cooling fluid is supplied to the rotor 12 through the fluid transfer tube 98 in a known manner. The cooling fluid sprays from the fluid transfer tube 98 into the interior of the inner shaft 90. The centrifugal force generated by the rotation of the rotor shaft assembly 32 sprays the fluid radially outward against the inner diameter of the wall of the inner shaft 90. The cooling fluid flows through the orifices 100a and 100b of the inner shaft 90 into the interior of the outer shaft 92.

The centrifugal force generated by the rotation of the outer shaft 92 drives the cooling fluid through the orifices 94a and into the channels 52 of the lamination 40 and through the orifices 94b. The fluid flowing through the orifices 94b impinges on the ends of the coil windings 70. The fluid that flows through the orifices 94a enters into the channels 52, which discharge near the fluid entry orifice 80 of the insulator 72. The cooling fluid flows through the fluid entry orifice 80 into the interior of the insulator 72. The insulator 72 facilitates containing the cooling fluid within the coil windings 70 and the cooling fluid is therefore in direct contact with the coil windings 70. The direct contact provides more efficient heat transfer and thereby allows the generator to tolerate increased heat loss such that smaller wire can be used for the coil windings 70.

The cooling fluid entering the coil windings 70 splits and flows toward each end of the coil winding 70. Once at the end, the cooling fluid must turn and flow to one of the fluid discharge outlets 122 of the end plate 112, which are located near the wedges 124. That is, the fluid discharge outlets 122 are located over the wedges 124 between the coil windings 70 and thereby cause the cooling fluid to turn from the ends of the coil windings 70 and travel a circumferential distance in order to exit from the rotor 12. The channels 52 and insulator 72 of the generator 10 thereby reduce pumping losses that normally increase with the square of the cooling fluid film thickness by containing the fluid to the coil windings 70. Cooling fluid that impinges on the rotor end turns 94b also flows through and around the end turn winding bundle and mixes with the cooling fluid from the cooling channels 52.

After flowing through the fluid discharge outlets 122, the fluid impinges on the inner surface 128 of the flange 126. The flange 126 thereby directs the cooling fluid radially outwards, where the fluid then impinges on the stator 14 (e.g., the stator end turns) of the generator 10. Thus, the end plate 112 also facilitates cooling the stator 14 end turns by jetting the cooling fluid radially outwards.

In the illustrated example, the fluid discharge outlets 122 are designed to be at a radial distance that is between the radially outer surface and the radially inner surface of the coil windings 70 to facilitate removing the cooling fluid, keep the ends of the coil windings 70 exposed for impingement flow, and provide adequate pressure from centrifugal force to spray the fluid toward the stator 14. Thus, the exemplary rotor 12 provides a contained flow of cooling oil from the center of the coil windings 70 towards the ends of the coil windings 70 to cool the rotor 12 in combination with impingement spray cooling of the ends of the coil windings 70.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotor for a dynamoelectric machine, comprising:
a rotor shaft including a first shaft having a first shaft wall circumscribing a hollow interior and having at least one first discharge orifice extending through the first shaft wall, and a second shaft within the hollow interior and coupled with the first shaft such that the first shaft and the second shaft are co-rotatable, the second shaft having a second shaft wall and at least one second discharge orifice extending through the second shaft wall, and the at least one first discharge orifice and the at least one second discharge orifice are axially spaced apart;
a rotor core including a plurality of laminations stacked together, the plurality of laminations including at least one lamination comprising a lamination body with an annular portion circumscribing an open center, a plurality of pole portions extending outwardly from the annular portion relative to the open center, and a plurality of coil winding regions adjacent to corresponding ones of the plurality of pole portions, the annular portion including at least one channel running between the open center and at least one of the plurality of open coil winding regions;
a plurality of coil windings wound on the rotor core;
a plurality of insulators each including an elongated insulator body comprising an electrically insulating material circumscribing an interior coil winding region through which at least a portion of one of the plurality of coil windings extends and spanning between open ends, the elongated insulator body including a fluid entry orifice between the open ends; and
an end plate secured near an end of the plurality of coil windings, the end plate including an end plate body having first and second sides, the first side having a plurality of coil end winding cover portions circumferentially spaced around the first side such that each coil end winding cover portion is adjacent an end of one of the plurality of coil windings, and at least fluid discharge outlet located circumferentially between two of the coil end winding cover portions and that extends between the first and second sides.

2. The rotor as recited in claim 1, wherein a ratio of a number of channels in the lamination body to a number of coil end winding cover portions of the end plate is 1-2.

3. The rotor as recited in claim 2, wherein the ratio is 2.

4. The rotor as recited in claim 1, wherein a ratio of a length-to-diameter ratio of the rotor core is about 0.72-0.82.

5. The rotor as recited in claim 1, wherein the first shaft has a plurality of first fluid discharge orifices and the second shaft has a plurality of second fluid discharge orifices, and a ratio of the number of the first fluid discharge orifices to the number of the second fluid discharge orifices is between 1 and 4.

6. A rotor for a dynamoelectric machine, comprising:
a rotor shaft including a first shaft having a first shaft wall circumscribing a hollow interior and having at least one first fluid discharge orifice extending through the first shaft wall, and a second shaft within the hollow interior and coupled with the first shaft such that the first shaft and the second shaft are co-rotatable, the second shaft having a second shaft wall and at least one second fluid discharge orifice extending through the second shaft wall, and the at least one first discharge orifice and the at least one second discharge orifice are axially spaced apart; and
a rotor core including a plurality of laminations stacked together, the plurality of laminations including at least one lamination comprising a lamination body with an annular portion circumscribing an open center, a plurality of pole portions extending outwardly from the annular portion relative to the open center, and a plurality of coil winding regions adjacent to corresponding ones of the plurality of pole portions, the annular portion including at least one channel running between a first end that opens to the open center and a second end that opens to one of the plurality of open coil winding regions.

7. The rotor as recited in claim 6, wherein a first ratio of a number of the channels to a number of the pole portions is 1-2.

8. The rotor as recited in claim 6, wherein a ratio of a number of the at least one first fluid discharge orifices to a number of the at least one second fluid discharge orifices is between 1 and 4.

9. A rotor shaft for a dynamoelectric machine, comprising:
a first shaft having a first shaft wall circumscribing a hollow interior and having a plurality of first fluid discharge orifices extending through the first shaft wall; and
a second shaft within the hollow interior and coupled with the first shaft such that the first shaft and the second shaft are co-rotatable, the second shaft having a second shaft wall and a plurality of second fluid discharge orifices extending through the second shaft wall, the plurality of first discharge orifices and the plurality of second discharge orifices are axially spaced apart and a ratio of the number of the first fluid discharge orifices to the number of the second fluid discharge orifices is between 1 and 4.

10. The rotor shaft as recited in claim 9, wherein the ratio is 2.

11. An insulator for a coil winding of a dynamoelectric machine, comprising:
an elongated insulator body comprising an electrically insulating material circumscribing an interior coil winding region and spanning between open ends, the elongated insulator body including a fluid entry orifice between the open ends.

12. The insulator as recited in claim 11, wherein the electrically insulating material comprises polyimide.

13. The insulator as recited in claim 11, wherein the fluid entry orifice is elongated in a direction that is non-parallel to a lengthwise direction of the elongated insulator body.

14. The insulator as recited in claim 11, wherein the fluid entry orifice is located within a middle one-third of a length of the elongated insulator body.

15. An end plate for a dynamoelectric machine, comprising:
an end plate body having first and second sides, the first side having a plurality of coil end winding cover portions circumferentially spaced around the first side, and at least one fluid discharge outlet that extends between the first and second sides and is located circumferentially between two of the coil end winding cover portions.

16. The end plate as recited in claim 15, wherein each of the plurality of coil end winding cover portions is a planar surface.

17. The end plate as recited in claim 15, wherein the end plate body includes an annular flange on the second side that is axially spaced from, and axially aligned with, the at least one fluid discharge outlet.

18. The end plate as recited in claim 15, wherein the at least one fluid discharge outlet is located a radial distance from a center of the end plate body, the radial distance being equivalent to a radial distance of a corresponding coil winding from the center.

* * * * *